(12) United States Patent
Pillsbury

(10) Patent No.: US 10,283,942 B1
(45) Date of Patent: May 7, 2019

(54) GROUNDING BAR

(71) Applicant: Jesse Pillsbury, Downey, ID (US)

(72) Inventor: Jesse Pillsbury, Downey, ID (US)

( * ) Notice: Subject to any disclaimer, the term of this patent is extended or adjusted under 35 U.S.C. 154(b) by 0 days.

(21) Appl. No.: 15/905,043

(22) Filed: Feb. 26, 2018

Related U.S. Application Data

(60) Provisional application No. 62/464,449, filed on Feb. 28, 2017.

(51) Int. Cl.
*H05K 5/02* (2006.01)
*H02B 1/16* (2006.01)
*H02B 1/20* (2006.01)
*H01R 4/30* (2006.01)

(52) U.S. Cl.
CPC .......... *H02B 1/16* (2013.01); *H02B 1/20* (2013.01); *H01R 4/30* (2013.01)

(58) Field of Classification Search
USPC ............. 439/213; 361/790; 174/135
See application file for complete search history.

(56) References Cited

U.S. PATENT DOCUMENTS

| | | | | |
|---|---|---|---|---|
| 1,391,046 A | * | 9/1921 | Cook | H02G 13/00 313/243 |
| 2,920,245 A | * | 1/1960 | Anderson | H05K 5/06 165/47 |
| 3,376,539 A | * | 4/1968 | Robinson | H01R 9/05 439/607.41 |
| 3,423,724 A | * | 1/1969 | Clement | H01R 4/34 439/798 |
| 3,466,589 A | * | 9/1969 | Sherman | H01R 13/41 439/109 |
| D223,668 S | * | 5/1972 | Ulrich | D13/120 |
| 4,270,019 A | * | 5/1981 | Thye | H01R 11/01 174/32 |
| 4,789,344 A | * | 12/1988 | Fritsch | H01R 25/142 439/114 |
| 5,119,059 A | * | 6/1992 | Covi | H01F 27/38 323/250 |
| 5,336,100 A | * | 8/1994 | Gabrius | H01R 25/14 439/115 |
| 5,777,263 A | | 7/1998 | Maehler et al. | |
| 6,205,017 B1 | * | 3/2001 | Wilkie, II | H02B 1/21 174/70 B |
| 6,252,166 B1 | | 6/2001 | Leschinger | |
| 6,313,403 B1 | | 11/2001 | Livingston et al. | |
| 6,358,099 B1 | * | 3/2002 | Kolody | H02B 1/056 439/716 |
| 6,431,885 B1 | * | 8/2002 | Stroup | H01R 4/64 174/78 |
| 6,549,428 B1 | * | 4/2003 | Fontana | H02B 1/20 174/71 B |
| 6,674,000 B2 | | 1/2004 | Lambiaso | |
| 6,786,749 B2 | * | 9/2004 | Meiners | H02G 5/00 174/71 B |
| 7,122,739 B2 | | 10/2006 | Franks, Jr. | |

(Continued)

*Primary Examiner* — William H. Mayo, III
*Assistant Examiner* — Krystal Robinson
(74) *Attorney, Agent, or Firm* — Cramer Patent & Design, PLLC; Aaron R. Cramer

(57) ABSTRACT

A grounding bar is fashioned as having two (2) offset planar surfaces joined at opposite lengthwise sides by a common slanted wall. Each planar surface has a plurality of apertures disposed therein.

18 Claims, 4 Drawing Sheets

(56) References Cited

U.S. PATENT DOCUMENTS

| | | | | |
|---|---|---|---|---|
| 7,741,733 B1 * | 6/2010 | Slavik | ............... | H02J 7/0045 |
| | | | | 307/43 |
| 7,859,857 B2 | 12/2010 | Bucciferro | | |
| 8,456,807 B2 * | 6/2013 | Tallam | ............ | H01F 41/0213 |
| | | | | 174/68.2 |
| 8,581,115 B2 | 11/2013 | Lawrence | | |
| 8,608,495 B2 * | 12/2013 | He | ............ | G06F 1/188 |
| | | | | 439/212 |
| D743,903 S * | 11/2015 | Krivonak | ............ | D13/147 |
| 2003/0067749 A1 * | 4/2003 | Tamba | ............ | H05K 7/20927 |
| | | | | 361/699 |
| 2003/0157822 A1 * | 8/2003 | Green | ............ | H01R 4/64 |
| | | | | 439/213 |
| 2004/0018417 A1 * | 1/2004 | Stack | ............ | H01H 85/044 |
| | | | | 429/61 |
| 2009/0004895 A1 * | 1/2009 | Duley | ............ | H01R 11/01 |
| | | | | 439/92 |
| 2012/0017021 A1 * | 1/2012 | Keegan | ............ | H01R 25/142 |
| | | | | 710/305 |
| 2013/0017693 A1 * | 1/2013 | Li | ............ | H01R 25/16 |
| | | | | 439/110 |

\* cited by examiner

GROUNDING BAR

RELATED APPLICATIONS

The present invention was first described in and claims the benefit of U.S. Provisional Patent Application No. 62/464,449 filed on Feb. 28, 2017, the entire disclosures of which are incorporated herein by reference.

FIELD OF THE INVENTION

The present invention relates generally to the field of grounding bars for electrical equipment.

BACKGROUND OF THE INVENTION

Many pieces of electrical equipment as well as electrical distribution panels will utilize an external ground bar for connection of all grounded conductors. Grounding bars are common place inside of electrical rooms or wherever major pieces of electrical equipment are located. Such grounding ensures that all voltages are referenced to a common point for proper operation and that all outer panel and equipment enclosures are at a common potential to eliminate shock and ensure safety.

Grounding bars are available in a wide variety of sizes and configurations depending on need and capacity, but all share the common characteristic of conductor access. In locations with a large quantity of conductors, access may be obtained on both sides of the bar. However, wire path ways quickly become crowded and access to add additional conductors at a later time become difficult. Additionally, access on both sides of the bar mean a large quantity of space, which is often at a premium in crowded locations. Accordingly, there exists a need for a means by which grounding conductor access to grounding bars can be enhanced in order to address the problems as described above. The development of the grounding bus bar fulfills this need.

SUMMARY OF THE INVENTION

To achieve the above and other objectives, the present invention provides for such a grounding bar having an upper face with at least one (1) mounting aperture and a plurality of first connection areas, a lower face with a plurality of second connection areas, and an angled intermediate area interconnecting the upper face from the lower face at an offset distance. Each first connection area and second connection area is capable of receiving a grounding conductor.

It is an object of the present invention to provide such a grounding bar, where each first connection area has a first connection hole and a first connection slot, and each second connection area has a second connection hole and a second connection slot. In some embodiments, there is either a fixed or a variable first distance between an individual first connection hole and an adjacent first connection slot. In some embodiments, there is either a fixed or a variable second distance between an individual second connection hole and an adjacent second connection slot.

It is another object of the present invention to provide such an offset distance to three-eighths of an inch (⅜ in.).

In a first embodiment, the grounding bar is made out of a copper material. In a second embodiment, the grounding bar is made out of a copper material. In a third embodiment, the grounding bar is made out of a copper material.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
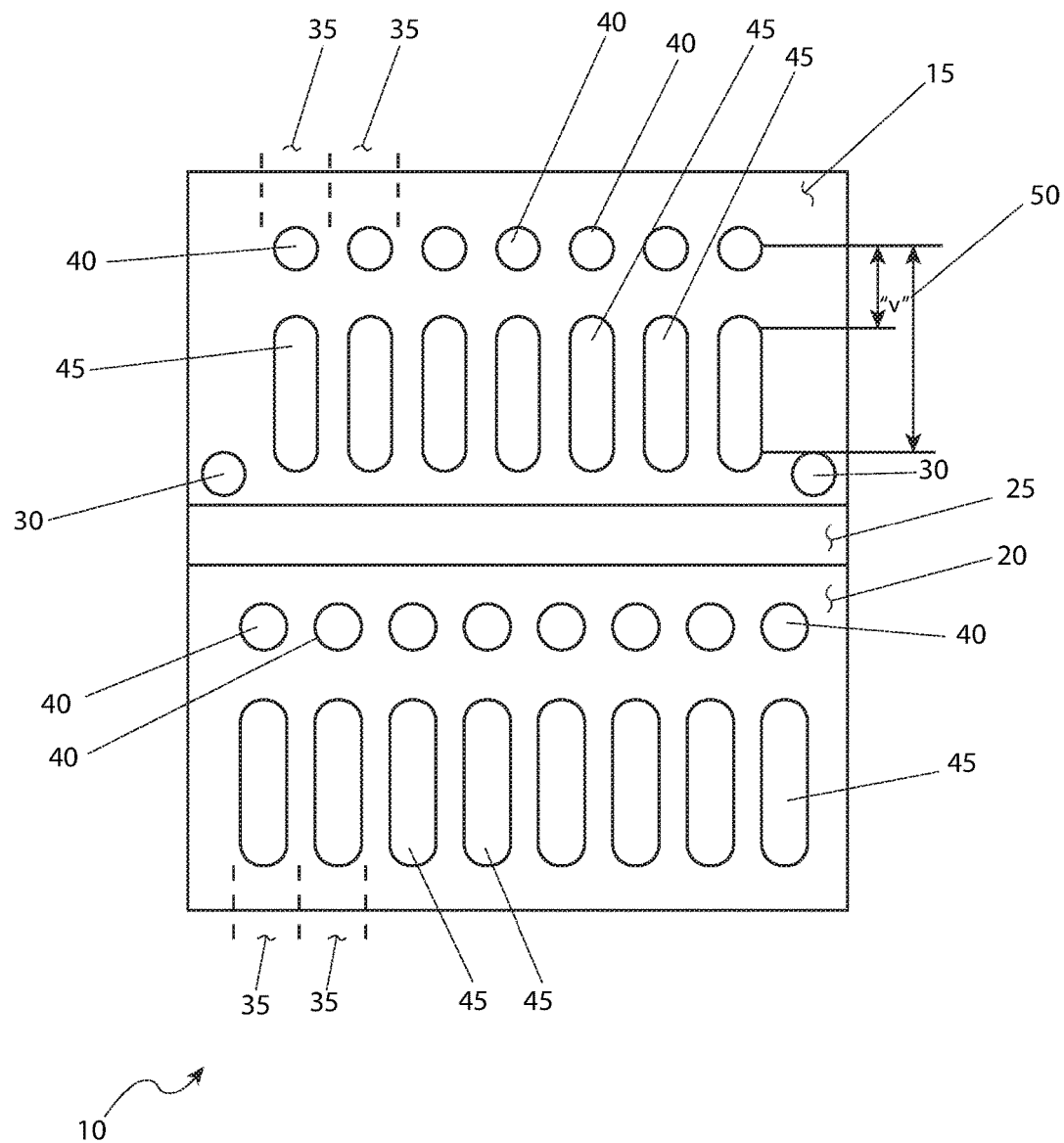
FIG. 1 is a front view of the dual layer grounding bus bar 10, according to the preferred embodiment of the present invention.

10 dual layer grounding bus bar
15 upper protruding face
20 lower recessed face
25 angled interconnecting area
30 mounting hole
35 connection area
40 circular hole
45 elongated hole
50 variable distance "v"
55 offset distance "o"
60 vertical surface
65 first fastener
70 standoff device
75 clearance area
80 grounding conductor
85 lug connector
90 wire
95 bolt
100 nut
105 grounding conductor "a"
110 grounding conductor "b"
115 grounding conductor "c"
120 electrical room
125 raceway

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, a front view of the dual layer grounding bus bar 10, according to the preferred embodiment of the present invention, is disclosed. The dual layer grounding bus bar 10 (herein described as the "device") 10, is particularly suited for use in grounding electrical enclosures, equipment, raceways, and other associated electrical infrastructure.

The device 10 is envisioned to be manufactured of bare copper, hot dipped galvanized, or tin coated material. While the exact size of the device 10 would vary per each application, it is envisioned that a standard size would be eight inches (8 in.) wide, five inches (5 in.) tall, and approximately three-sixteenths of an inch (3/16 in.) thick. The device 10 comprises an upper protruding face 15, a lower recessed face 20, and an angled interconnecting area 25. The upper protruding face 15 provides for two (2) mounting holes 30 for mounting on insulated or non-insulated standoffs. Insulated standoffs would be utilized in the case of isolated grounds, while non-insulated standoffs would be utilized for conventional equipment or safety grounds. Both the upper protruding face 15 and the lower recessed face 20 provide for connection areas 35, each of which accepts a lugged grounding conductor. The approximate dimension between each connection area 35 is envisioned as a minimum of three-eighths of an inch (3/8 in.). The connection areas 35 likewise comprise of a circular hole 40 and an elongated hole 45. The circular hole 40 would be utilized individually in the case of a single hole lug, while both the circular hole 40 and the elongated hole 45 would be utilized in the case of double hole barrel lugs. A distance "v" 50 between the circular hole 40 and the elongated hole 45 accommodates double hole barrel lugs of all sizes. This distance "v" 50 can be variable or fixed. It is envisioned that the circular hole 40 could be threaded for standard size bolts. The elongated hole 45 would utilize a bolt and nut combination. Other electrical attachment methods such as brazing, welding, thermowelding (Cadwelding®) or the like could also be utilized provided appropriate mechanical strength and electrical conductivity is provided. As such, the exact method of connection between the device 10 and any attached grounding connection is not intended to be a limiting factor of the present invention.

Figure 2:
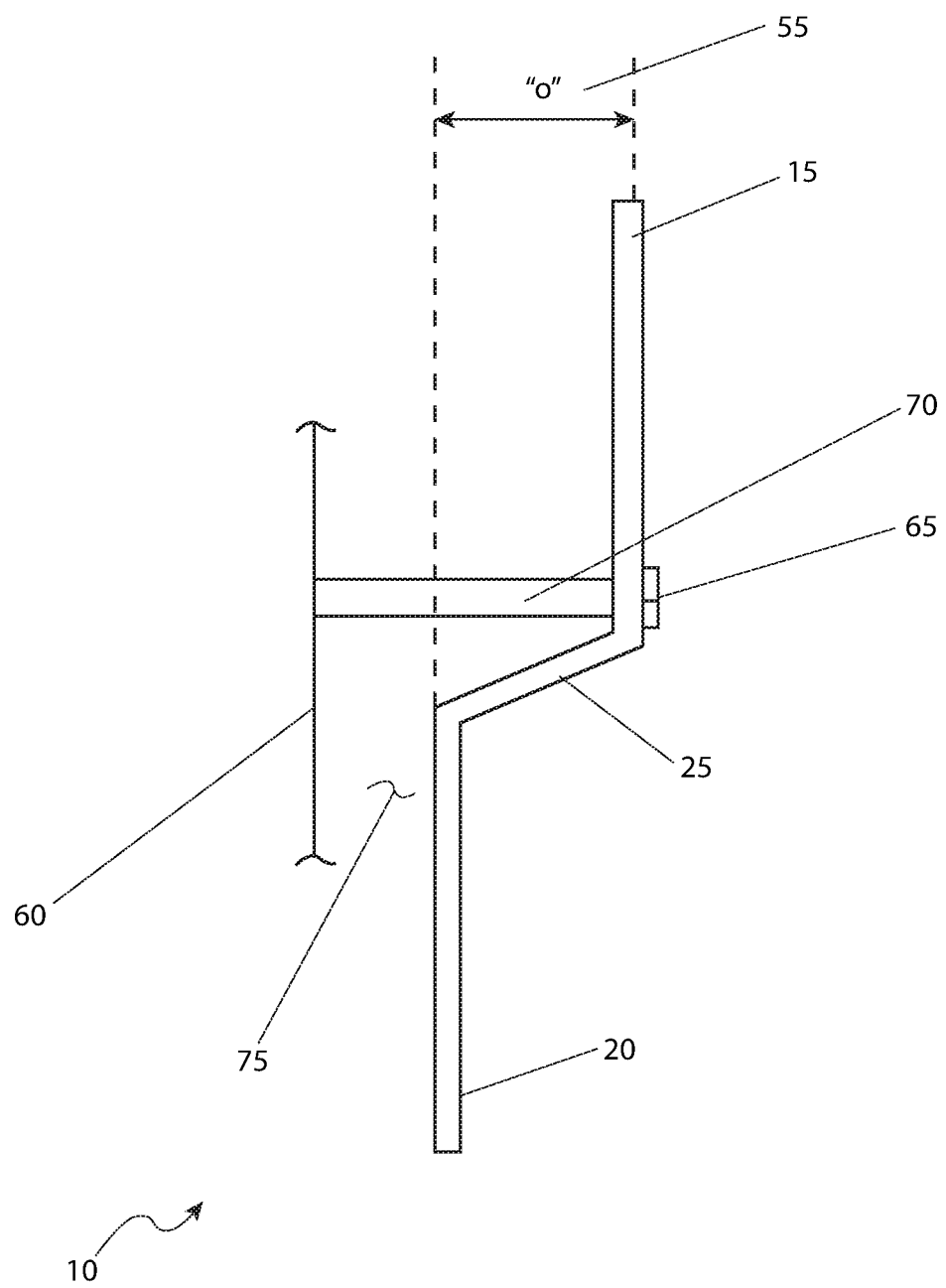
FIG. 2 is a side view of the dual layer grounding bus bar 10, according to the preferred embodiment of the present invention.

Referring next to FIG. 2, a side view of the device 10, according to the preferred embodiment of the present invention is depicted. The upper protruding face 15, the angled interconnecting area 25, and the lower recessed face 20, are all readily visible. The angled interconnecting area 25 provides for a "Z"-shape configuration, as visible in said side view. As such, the angled interconnecting area 25 provides the ability for twice the number of grounding conductors to be connected to the device 10 without interfering with each other. It is envisioned that the offset provided by the angled interconnecting area 25 would be a minimum of three-eighths of an inch (3/8 in.) as indicated by an offset distance "o" 55. The device 10 is mounted to a vertical surface 60 such as a wall of an electrical room or utility area. The vertical surface 60 could also be the interior wall surface of a large electrical enclosure such as switchboard, switchgear, overheat mounting structure or the like. The specific use of the device 10 upon any particular type of vertical surface 60 is not intended to be a limiting factor of the present invention. A first fastener 65 is used in conjunction with a standoff device 70 such as a sleeve, collar, nut or the like to provide a clearance area 75 between the lower recessed face 20 and the vertical surface 60.

Figure 3:
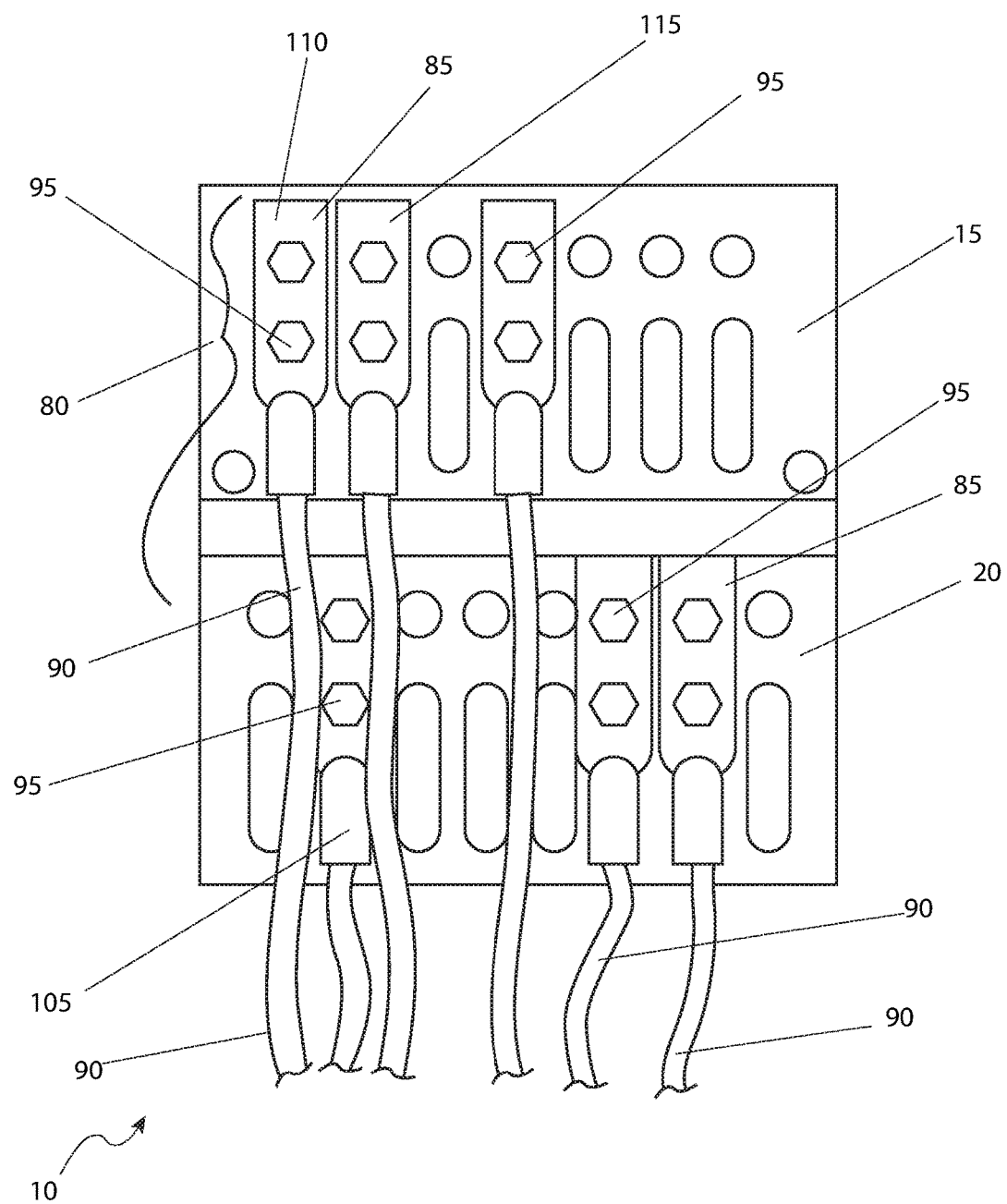
FIG. 3 is a front view of the dual layer grounding bus bar 10, shown with grounding conductors 80 attached, according to the preferred embodiment of the present invention; and, FIG. 4 is a perspective view of the dual layer grounding bus bar 10, shown in an installed state, according to the preferred embodiment of the present invention.

Referring now to FIG. 3, a front view of the device 10, shown with grounding conductors 80 attached, according to the preferred embodiment of the present invention is shown. Each grounding conductor 80 includes a lug connector 85 and a wire 90 and is held in place to either the upper protruding face 15 or the lower recessed face 20 using a bolt 95 and a nut 100 (note the nut 100 is not visible due to illustrative limitations and may not be required in all installations). As can be easily seen, a grounding conductor "a" 105 is installed on the lower recessed face 20 while a grounding conductor "b" 110 and a grounding conductor "c" 115 are installed on the upper protruding face 15, with the grounding conductor "a" 105 taking no more additional horizontal space that the grounding conductor "b" 110 and grounding conductor "c" 115 do in a singular fashion. As such, the horizontal efficiency of the device 10 is double that a conventional grounding bar with the same width. Such space efficiency makes the device 10 especially useful in areas that are crowded or where access is limited.

Figure 4:
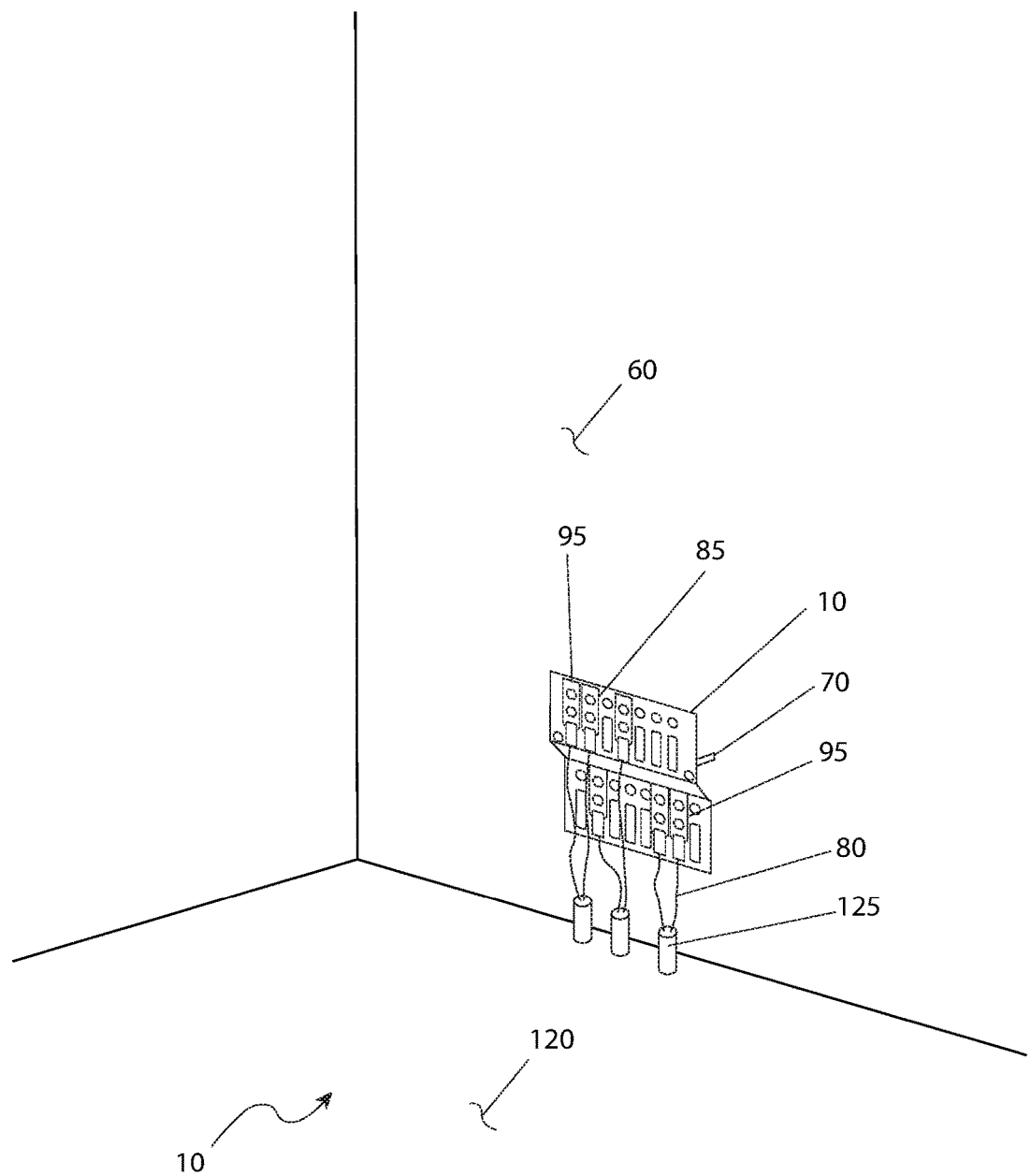

Referring finally to FIG. 4, a perspective view of the device 10, shown in an installed state, according to the preferred embodiment of the present invention is disclosed. The device 10 is shown in an electrical room 120 for the purposes of control of electrical discharge of lightning and or static electricity as dictated by industry standards, electrical regulations, local compliance or the like. The device 10 is attached to the vertical surface 60 (here depicted as the wall of the electrical room 120) using standoff device 70 as aforementioned described. The grounding conductors 80, complete with lug connector 85 enter the electrical room 120 through raceways 125 such as conduits, direct embedment, wall mounted channels, cable trays or the like. The lug connector 85 are then terminated upon the device 10 using bolt 95 in a common manner that is well-known in the art. It is envisioned that the device 10 would be installed in new installations or used to replace existing grounding bars where capacity is at a maximum or access is limited. The device 10 may also be used to supplement existing grounding bars and installed as an auxiliary connection point. The device 10 would be connected to the existing grounding bar by ideally at least two (2) grounding conductors in a loop configuration. It should be noted that while the previous FIGURES have shown the grounding conductors 80 attaching to the device 10 from one (1) direction only, they may also enter from both directions (top and bottom). The use of grounding conductors 80 from any one (1) particular direction or axis is not intended to be a limiting factor of the present invention.

The preferred embodiment of the present invention can be utilized by the common user in a simple and effortless manner with little or no training. It is envisioned that the device r 10 would be constructed in general accordance with FIG. 1 through FIG. 4.

The device 10 would be formed of one complete piece of metal, preferably but not limited to copper) in a stamping process that would produce the angled interconnecting area 25, the mounting holes 30, the circular hole 40 and the elongated hole 45. Various other finishing methods such as plating would be utilized to preserve electrical continuity, reduce resistance, and reduce corrosion. It is envisioned that the device 10 would be manufactured in a wide variety of sizes to suite all installation specifications and requirements. At this point in time, the device 10 is ready for installation.

To install the device 10, a suitable location in an electrical room 120 or other needed location is selected. It is attached to a suitable vertical surface 60 using the first fastener 65 and standoff device 70 as required. Next, grounding conductors 80 are routed to the location of the device 10 using raceways 125 if required. The wire 90 are then cut to length and terminated with suitable lug connector 85. They are then connected to either the upper protruding face 15 or the lower recessed face 20 of the device 10 using bolt 95 and nut 100 which are torqued to the required specification. Testing of the electrical grounding system is performed in a standard manner to ensure electrical safety to complete the installation process.

Future additional grounding conductors 80 can be attached to the device 10 provided additional connection areas 35 exists as required.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A grounding bar, comprising:
   an upper face having at least one mounting aperture and a plurality of first connection areas;
   a lower face having a plurality of second connection areas; and,
   an angled intermediate area interconnecting said upper face from said lower face to provide said upper face from said lower face at an offset distance;
   wherein each first connection area further comprises:
   a first connection hole; and,
   a first connection slot;
   wherein each second connection area further comprises:
   a second connection hole; and,
   a second connection slot;
   wherein said grounding bar is a copper material; and,
   wherein each said first connection area and said second connection area are receiving a grounding conductor, a lug connector and a wire and is held in place to either said upper protruding face or said lower recessed face using a bolt and a nut.

2. The grounding bar of claim 1, wherein said offset distance is three-eighths of an inch.

3. The grounding bar of claim 1, further comprising:
   a fixed first distance between an individual first connection hole and an adjacent first connection slot; and,
   a fixed second distance between an individual second connection hole and an adjacent second connection slot.

4. The grounding bar of claim 1, further comprising:
   a fixed first distance between an individual first connection hole and an adjacent first connection slot; and,
   a fixed second distance between an individual second connection hole and an adjacent second connection slot.

5. The grounding bar of claim 1, further comprising:
   a fixed first distance between an individual first connection hole and an adjacent first connection slot; and,
   a fixed second distance between an individual second connection hole and an adjacent second connection slot.

6. The grounding bar of claim 1, further comprising:
   a fixed first distance between an individual first connection hole and an adjacent first connection slot; and,
   a fixed second distance between an individual second connection hole and an adjacent second connection slot.

7. A grounding bar, comprising:
   an upper face having at least one mounting aperture and a plurality of first connection areas;
   a lower face having a plurality of second connection areas; and,
   an angled intermediate area interconnecting said upper face from said lower face to provide said upper face from said lower face at an offset distance;
   wherein each first connection area further comprises:
   a first connection hole; and,
   a first connection slot;
   wherein each second connection area further comprises:
   a second connection hole; and,
   a second connection slot;
   wherein said grounding bar is a hot-dipped galvanized material; and,
   wherein each said first connection area and said second connection area are receiving a grounding conductor, a lug connector and a wire and is held in place to either said upper protruding face or said lower recessed face using a bolt and a nut, said grounding conductor.

8. The grounding bar of claim 7, wherein said offset distance is three-eighths of an inch.

9. The grounding bar of claim 7, further comprising:
   a fixed first distance between an individual first connection hole and an adjacent first connection slot; and,
   a fixed second distance between an individual second connection hole and an adjacent second connection slot.

10. The grounding bar of claim 7, further comprising:
    a fixed first distance between an individual first connection hole and an adjacent first connection slot; and,
    a fixed second distance between an individual second connection hole and an adjacent second connection slot.

11. The grounding bar of claim 7, further comprising:
    a fixed first distance between an individual first connection hole and an adjacent first connection slot; and,
    a fixed second distance between an individual second connection hole and an adjacent second connection slot.

12. The grounding bar of claim 7, further comprising:
    a fixed first distance between an individual first connection hole and an adjacent first connection slot; and,
    a fixed second distance between an individual second connection hole and an adjacent second connection slot.

13. A grounding bar, comprising:
    an upper face having at least one mounting aperture and a plurality of first connection areas;
    a lower face having a plurality of second connection areas; and,
    an angled intermediate area interconnecting said upper face from said lower face to provide said upper face from said lower face at an offset distance;
    wherein each first connection area further comprises:
    a first connection hole; and,
    a first connection slot;
    wherein each second connection area further comprises:
    a second connection hole; and,
    a second connection slot;
    wherein said grounding bar is a tin-coated material; and,
    wherein each said first connection area and said second connection area are receiving a grounding conductor, a lug connector and a wire and is held in place to either said upper protruding face or said lower recessed face using a bolt and a nut.

14. The grounding bar of claim 13, wherein said offset distance is three-eighths of an inch.

15. The grounding bar of claim 13, further comprising:
a fixed first distance between an individual first connection hole and an adjacent first connection slot; and,
a fixed second distance between an individual second connection hole and an adjacent second connection slot.

16. The grounding bar of claim 13, further comprising:
a fixed first distance between an individual first connection hole and an adjacent first connection slot; and,
a fixed second distance between an individual second connection hole and an adjacent second connection slot.

17. The grounding bar of claim 13, further comprising:
a fixed first distance between an individual first connection hole and an adjacent first connection slot; and,
a fixed second distance between an individual second connection hole and an adjacent second connection slot.

18. The grounding bar of claim 13, further comprising:
a fixed first distance between an individual first connection hole and an adjacent first connection slot; and,
a fixed second distance between an individual second connection hole and an adjacent second connection slot.

* * * * *